United States Patent
Gauthier et al.

(10) Patent No.: US 9,604,526 B2
(45) Date of Patent: Mar. 28, 2017

(54) METHOD FOR PROVIDING IMPROVED DRIVEABILITY FOR A VEHICLE

(75) Inventors: Greg Edward Gauthier, Dearborn, MI (US); John Proietty, Ferndale, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1654 days.

(21) Appl. No.: 12/329,061

(22) Filed: Dec. 5, 2008

(65) Prior Publication Data
US 2010/0145559 A1 Jun. 10, 2010

(51) Int. Cl.
| | | |
|---|---|---|
| *B60L 9/00* | (2006.01) | |
| *B60K 6/365* | (2007.10) | |
| *B60K 6/445* | (2007.10) | |
| *B60W 10/06* | (2006.01) | |
| *B60W 10/08* | (2006.01) | |
| *B60W 50/00* | (2006.01) | |
| *B60W 50/16* | (2012.01) | |
| *B60K 1/02* | (2006.01) | |
| *B60W 20/00* | (2016.01) | |

(52) U.S. Cl.
CPC ............ *B60K 6/365* (2013.01); *B60K 6/445* (2013.01); *B60W 10/06* (2013.01); *B60W 10/08* (2013.01); *B60W 50/0098* (2013.01); *B60W 50/16* (2013.01); *B60K 1/02* (2013.01); *B60L 2240/423* (2013.01); *B60L 2240/486* (2013.01); *B60W 20/00* (2013.01); *B60W 2520/10* (2013.01); *B60W 2520/105* (2013.01); *B60W 2540/12* (2013.01); *B60W 2540/16* (2013.01); *B60W 2710/0666* (2013.01); *B60W 2710/083* (2013.01); *Y02T 10/56* (2013.01); *Y02T 10/6239* (2013.01); *Y02T 10/6286* (2013.01); *Y02T 10/642* (2013.01)

(58) Field of Classification Search
CPC .......... B60K 6/365; B60K 6/445; B60K 1/02; B60W 10/06; B60W 10/08; B60W 50/0098; B60W 50/16; B60W 20/00; B60W 2520/10; B60W 2520/105; B60W 2540/12; B60W 2540/16; B60W 2710/0666; B60W 2710/083; B60L 2240/486; Y02T 10/56
USPC ...................... 701/22, 36; 903/902
See application file for complete search history.

(56) References Cited

U.S. PATENT DOCUMENTS 5,751,579 A * 5/1998 Hrovat .................. B60K 28/16
701/71
6,036,285 A * 3/2000 Murphy .............. B60T 8/17616
188/181 T (Continued)

FOREIGN PATENT DOCUMENTS

| CN | 1849473 A | 10/2006 |
|---|---|---|
| EP | 1752349 A1 | 2/2007 |
| WO | 2005/015058 A1 | 2/2005 |

OTHER PUBLICATIONS

Office Action dated Jul. 24, 2013 for corresponding Chinese Application 200910252845.9 filed Dec. 4, 2009.

*Primary Examiner* — Shardul Patel
(74) *Attorney, Agent, or Firm* — David B. Kelley; Brooks Kushman P.C.

(57) ABSTRACT

A method for controlling torque delivery in a vehicle powertrain using an enhanced limited operating strategy. The strategy is implemented when a powertrain controller fails to respond properly to a driver command for traction wheel torque whereby a modified wheel torque at vehicle traction wheels under driver control is made available.

16 Claims, 9 Drawing Sheets

(56) References Cited

U.S. PATENT DOCUMENTS

| | | |
|---|---|---|
| 6,278,916 B1 | 8/2001 | Crombez |
| 6,295,500 B1 | 9/2001 | Cullen et al. |
| 6,328,671 B1 | 12/2001 | Nakajima et al. |
| 6,381,529 B1 * | 4/2002 | Mistry .................... F16D 31/02 180/307 |
| 6,490,511 B1 | 12/2002 | Raftari et al. |
| 6,513,492 B1 | 2/2003 | Bauerle et al. |
| 6,920,383 B2 | 7/2005 | Graf et al. |
| 2003/0006076 A1 | 1/2003 | Tamor |
| 2003/0220171 A1 * | 11/2003 | Sauter ................... B60K 28/16 477/166 |
| 2005/0159861 A1 * | 7/2005 | Iwatsuki ............... B60W 10/08 701/22 |
| 2006/0015231 A1 * | 1/2006 | Yoshimura ............... B60K 6/46 701/48 |
| 2006/0021811 A1 * | 2/2006 | Kuang ................... B60K 6/365 180/65.25 |
| 2007/0050118 A1 * | 3/2007 | Murray ................. B60W 10/06 701/54 |
| 2007/0051554 A1 * | 3/2007 | Thacher ................ B60T 8/1755 180/423 |
| 2009/0018739 A1 * | 1/2009 | Ohmori ................... B60T 7/122 701/70 |
| 2009/0063028 A1 * | 3/2009 | Aitchison ............. B60W 10/06 701/113 |
| 2009/0203496 A1 * | 8/2009 | Staub ....................... B60K 6/46 477/3 |
| 2010/0030421 A1 * | 2/2010 | Yoshimura ............... B60K 6/46 701/31.4 |
| 2010/0076661 A1 * | 3/2010 | Ueoka .................. B60L 3/0038 701/84 |

* cited by examiner

METHOD FOR PROVIDING IMPROVED DRIVEABILITY FOR A VEHICLE

BACKGROUND OF THE INVENTION

1. Field of the Invention

The invention relates to a vehicle powertrain in which provision is made for delivering motive power to vehicle traction wheels in the event of a powertrain control signal failure.

2. Background Art

It is known design practice in the automotive industry to establish a limited power operating strategy for a vehicle powertrain in the event of a powertrain control malfunction. This involves the use of a vehicle creep mode during a so-called "quit-on-the-road" (QOR) event. Upon a loss of a driver-activated acceleration control signal for the powertrain, the powertrain creep mode of operation will permit the operator of the vehicle to maneuver the vehicle off a roadway. This operating strategy is known in the automotive industry as a limited operating strategy (LOS). It is initiated by a loss of signal, which may be identified by the same acronym.

The LOS drive mode is used in situations involving accelerator pedal faults and other faults in which the vehicle system controller will not respond to accelerator pedal movement by the vehicle driver. It is known practice to implement an LOS drive mode in conventional powertrain designs by commanding an engine throttle plate to a fixed throttle angle, thereby commanding a fixed limited power from the engine. This provides a limited wheel torque with a calibrated torque delivery delay.

In the case of a hybrid electric vehicle of the type described, for example, in U.S. Pat. No. 6,994,360, a conventional LOS drive mode is not available because of the powertrain architecture for that type of hybrid electric vehicle. Known methods for implementing an LOS drive mode in response to accelerator pedal signal faults or other similar faults in a hybrid electric vehicle powertrain control system require special strategies to improve the performance of the LOS drive mode.

SUMMARY OF THE INVENTION

The invention comprises what may be described as a "super-creep" strategy. It is designed to use a closed-loop control that would allow a vehicle to respond to a powertrain control failure by permitting the vehicle to be driven, for example, up roadway grades that would not be available using known LOS strategies that involve commanding the engine throttle plate to a fixed angle. The strategy of the present invention uses an estimated wheel torque and a torque feedback variable to determine an amount of feedforward torque to be delivered to vehicle traction wheels in order to achieve a desired vehicle acceleration rate. It will allow the operator to control vehicle acceleration under a wide range of environmental or road conditions while providing smooth, predictable acceleration.

Unlike conventional LOS operation, which commands a "clipped" or limited amount of torque, the super-creep mode of operation of the present invention controls the amount of powertrain torque commanded to be delivered based on a feedback control using calculated vehicle acceleration rates. An acceleration rate request is converted to an output shaft torque request. The acceleration rate can be calibrated so that it will vary based upon vehicle speed.

The strategy of the present invention uses the brake pedal to provide a brake override feature. This feature will permit brake pedal application to cancel the torque commanded to be delivered by the powertrain during LOS operation. In this way, the driver will be able to maintain control of vehicle speed by using the brake pedal. For this reason, the strategy of the present invention will include an initial test of brake pedal input to verify that braking torque is available.

The super-creep strategy of the present invention, will limit maximum torque delivered to the powertrain to a calibratable limit. It provides a maximum torque clip based on a calibratable speed limit.

The super-creep strategy of the invention, once it is initiated, is non-recoverable so that the driver will not be surprised if the normal function of the control system will unexpectedly return to normal following LOS mode operation, when full torque would be delivered to the traction wheels. Normal function would return, if appropriate, during the next key cycle. Further, the strategy will reduce the chance of a wheel spin on road surfaces with a low friction coefficient. The strategy will monitor the acceleration rate so that the acceleration requested by the controller will not exceed a desired amount (e.g., 0.15 g). The control feedback feature of the invention will adjust the amount of torque required to move the vehicle at a calibratable acceleration.

In executing the strategy of the invention, an acceleration request by the driver will be converted to an output shaft torque request. A calibratable rate of acceleration based on vehicle speed will change for different speeds. After the acceleration request is converted to an output shaft torque request, it is sent to a torque control feature of the control system.

The invention may be applied to vehicles with a powertrain other than a hybrid electric vehicle powertrain of the type disclosed herein. For example, it may be applied to a vehicle with a powertrain powered only by a conventional internal combustion engine, by a fuel cell, by an electric motor and battery system, etc., wherein desired wheel torque is determined using electronic controls.

PARTICULAR DESCRIPTION OF AN EMBODIMENT OF THE INVENTION

For the purpose of describing an operating environment of a hybrid electric vehicle powertrain which include a controller programmed to use the strategy of the present invention, reference will be made to FIG. 1. A power-split hybrid electric vehicle powertrain shown in FIG. 1 includes an engine that functions as a first power source, and a second power source that includes at least one electric motor and high voltage battery. These power sources establish a mechanical power flow path and an electrical power flow path. A mechanical power flow path delivers engine power to vehicle traction wheels by controlling generator speed, whereby the powertrain may act in a manner similar to a continuously variable transmission where vehicle speed changes do not depend upon engine speed changes. The combination of the motor, the generator and the planetary gearing, illustrated in FIG. 1, define as an electro-mechanical, continuously-variable power flow path.

Figures 1, 1A:
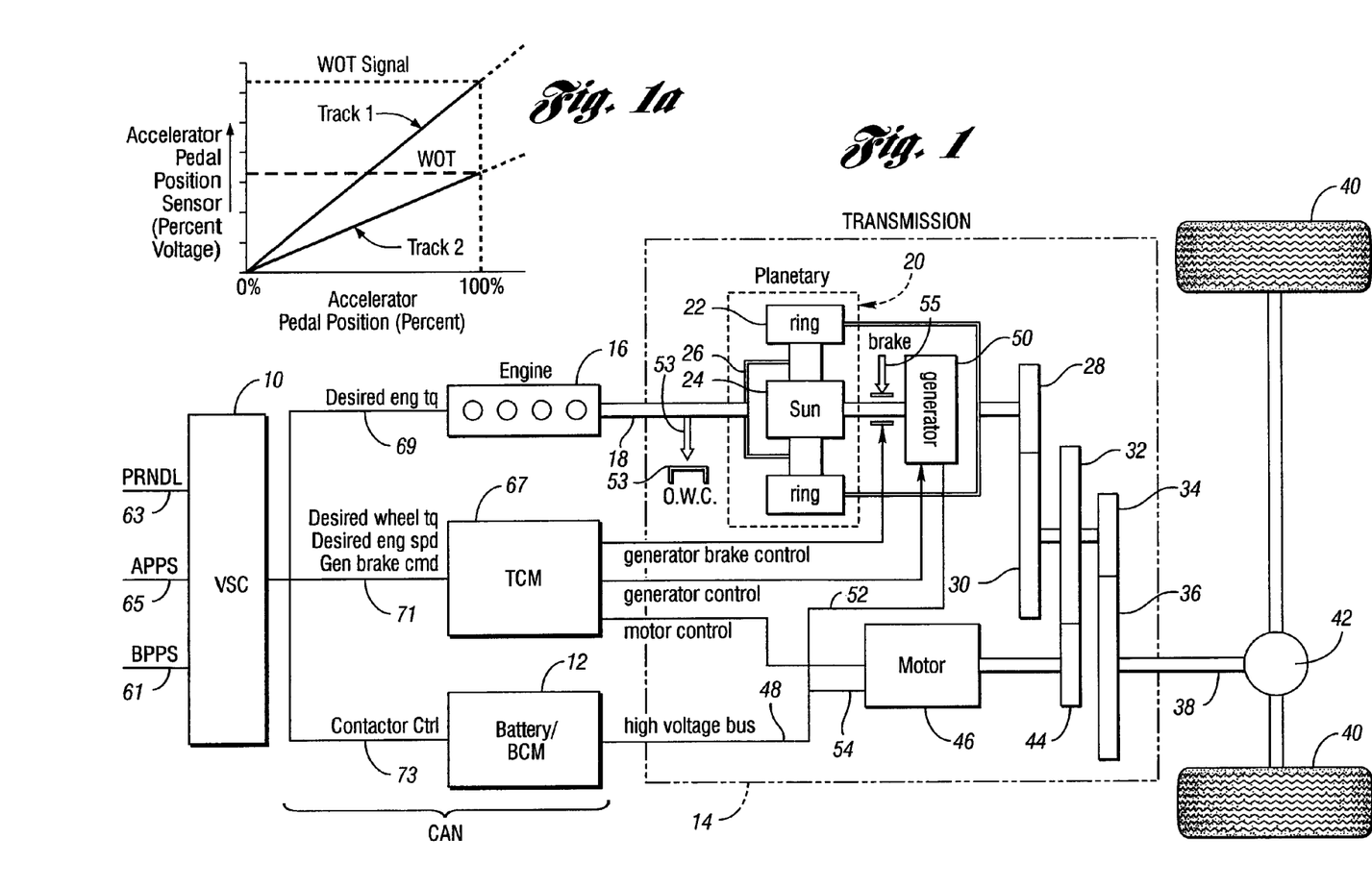
FIG. 1 is a schematic representation of a power-split hybrid electric vehicle powertrain of known design, which is adapted to include the control strategy of the present invention.
FIG. 1a is a plot of accelerator pedal position sensor output in percent of voltage reference output for various percent pedal rotation positions, the accelerator pedal position being monitored using redundant sensors, each sensor having a separate plot or track.

FIG. 1 shows a vehicle system controller (VSC) 10, a battery 12 and a transmission 14, together with a motor-generator subsystem and a control area network (CAN). An engine 16, controlled by controller 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34 and 36. A torque output shaft 38 for the transaxle is drivably connected to vehicle traction wheels 40 through a differential-and-axle mechanism 42.

Gears 30, 32 and 34 are mounted on a countershaft, the gear 32 engaging a motor-driven gear 44. Electric motor 46 drives gear 44, which acts as a torque input for the countershaft gearing.

The battery 12 delivers electric power to the motor through power flow path 48. Generator 50 is connected electrically to the battery and to the motor in known fashion, as shown at 52.

When the powertrain battery 12 is acting as a sole power source with the engine off, the torque input shaft 18 and the carrier assembly 26 are braked by an overrunning coupling 53. A mechanical brake 55 anchors the rotor of generator 50 and the sun gear 24 when the engine is on and the powertrain is in a parallel drive mode, the sun gear 24 acting as a reaction element.

In FIG. 1, the vehicle system controller 10 receives a signal 63 from a transmission driver-actuated range selector (PRNDL). The signal is distributed to transmission control module 67, together with a desired wheel torque, a desired engine speed and a generator brake command, as shown at 71. A battery contactor or switch 73 is closed after vehicle "key-on" startup. The controller 10 issues a desired engine torque request to engine 16, as shown at 69, which is dependent on a sensor output 65 from accelerator pedal position sensor (APPS).

A brake pedal position sensor BPPS distributes a wheel brake signal 61 to the controller. The transmission control module issues a generator brake control signal to generator brake 55. It also distributes a generator control signal to generator 50.

As mentioned previously, there are two power sources for the driveline. The first power source is a combination of the engine and generator subsystems, which are connected together using the planetary gear unit 20. The other power source involves only the electric drive system, including the motor, the generator and the battery, where the battery acts as an energy storage medium for the generator and the motor.

A typical vehicle may include a dual track accelerator pedal position sensor that will output a voltage based on accelerator pedal position. FIG. 1a shows at Track 1 and Track 2 the slope for each accelerator pedal position sensor track. The vehicle control system determines the final accelerator pedal position based on a minimum voltage for each track.

FIG. 1a shows a different slope for each track. The purpose of the differences in slope is to provide the vehicle operator with an indication that one of the sensors has failed. With the loss of one pedal position sensor, the vehicle may enter a limited operating mode. With the loss of two accelerator pedal position sensors, the vehicle will enter the LOS super-creep mode.

The present invention would be implemented, in the case of a hybrid electric vehicle powertrain of the type shown in FIG. 1, when both accelerator pedal position sensors fail and the track 1 relationship and the track 2 relationship are both unavailable. The present invention will avoid a so-called "quit-on-the-road" (QOR) event in which the vehicle is severely limited in operation. The super-creep will make available an improved limited operating strategy (LOS). Before the strategy of the present invention is implemented, several accelerator pedal LOS strategy entry conditions must be satisfied. These entry conditions will be described subsequently with respect to FIGS. 4, 5 and 6.

Figure 2:
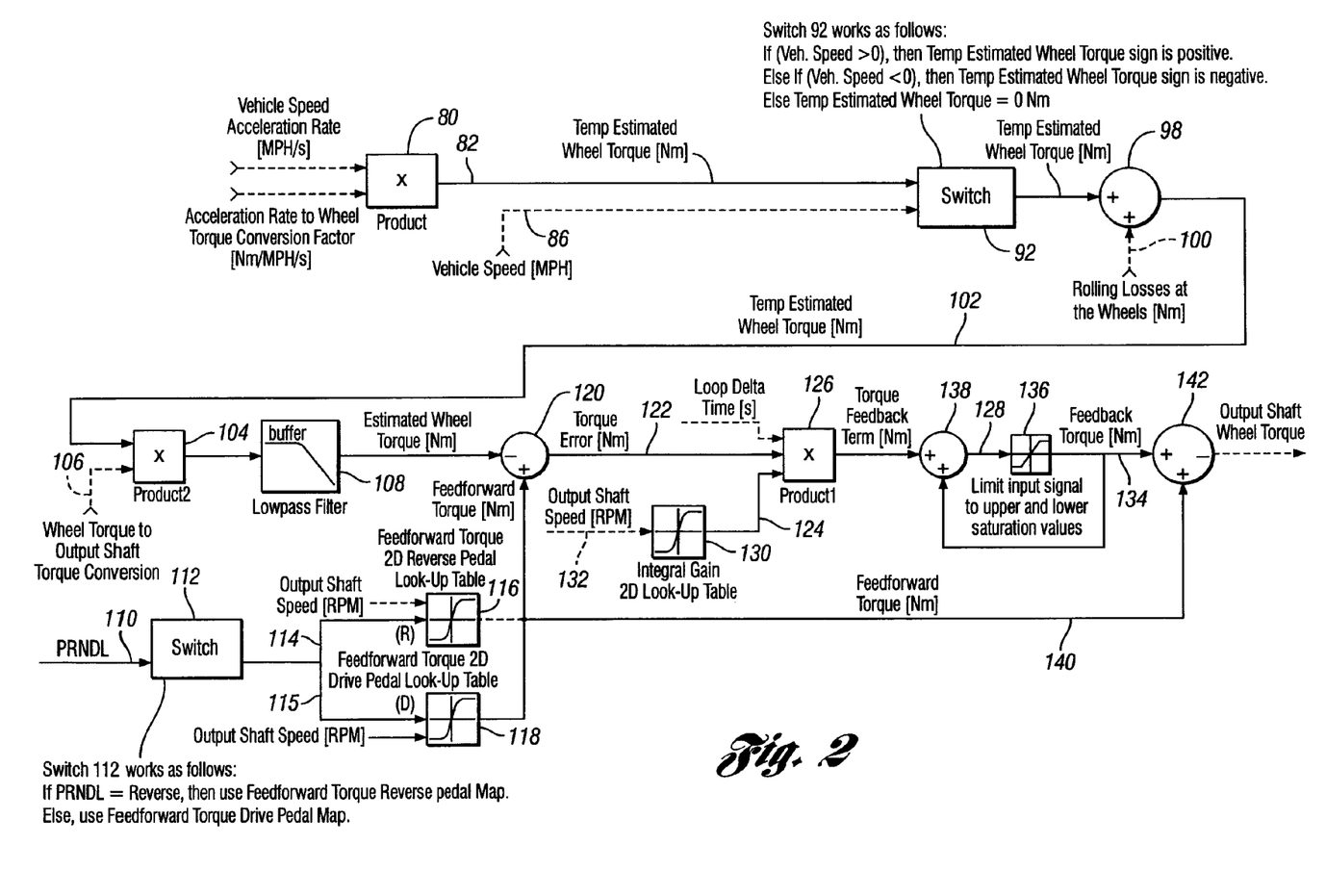
FIG. 2 is a schematic function block diagram of the control system of the present invention.

After the entry conditions are satisfied, a temporary estimated wheel torque is calculated as shown at 80 in FIG. 2. This is accomplished by multiplying the vehicle acceleration rate in miles per hour per second by the acceleration torque to wheel torque conversion factor in Newton-meters per miles per hour per second. The temporary estimated wheel torque is delivered to switch 92, shown in FIG. 2. Switch 92 receives a vehicle speed input, as shown at 86. If the vehicle speed signal is positive, then the temporary estimated wheel torque will be positive. On the other hand, if the vehicle speed signal is negative, then the temporary estimated wheel torque will be negative. If the vehicle speed is zero, then the temporary estimated wheel torque will be zero. The sign of the vehicle speed (plus or minus) becomes the sign of the temporary estimated wheel torque.

The temporary estimated wheel torque is transferred to a summing point 98 where the temporary estimated wheel torque, which can be plus or minus, is combined with a signal indicating mechanical rolling friction losses at the wheels, as shown at 100. Those losses are calibrated using a known calibration technique.

The resultant temporary estimated wheel torque is transferred, as shown at 102, to multiplier 104, where a wheel torque to output shaft torque conversion factor 106, which can be precalibrated, is multiplied by the temporary estimated wheel torque. The conversion factor would be the gear ratio of the vehicle axle assembly, including differential 42 in FIG. 1. If the axle ratio is one-to-one, the temporary estimated wheel torque, multiplied by the value of unity, will produce an unchanged output at 104.

The final estimated wheel torque is passed through a low pass filter 108, which acts as a buffer to eliminate transient torque peaks.

One of the driver inputs to the controller is a selection of reverse drive or forward drive. If the PRNDL position is reverse, the software will select an enhanced foot off pedal (FOP) calibratable look-up table or map. See, for example, FIG. 2*b*. If the PRNDL position is drive or low, the software will select a drive-enhanced foot off pedal (FOP) pedal map look-up table or map. See, for example, FIG. 2*a*. Each look-up table or map will deliver a corresponding torque value based on a corresponding vehicle speed.

Figure 2A:
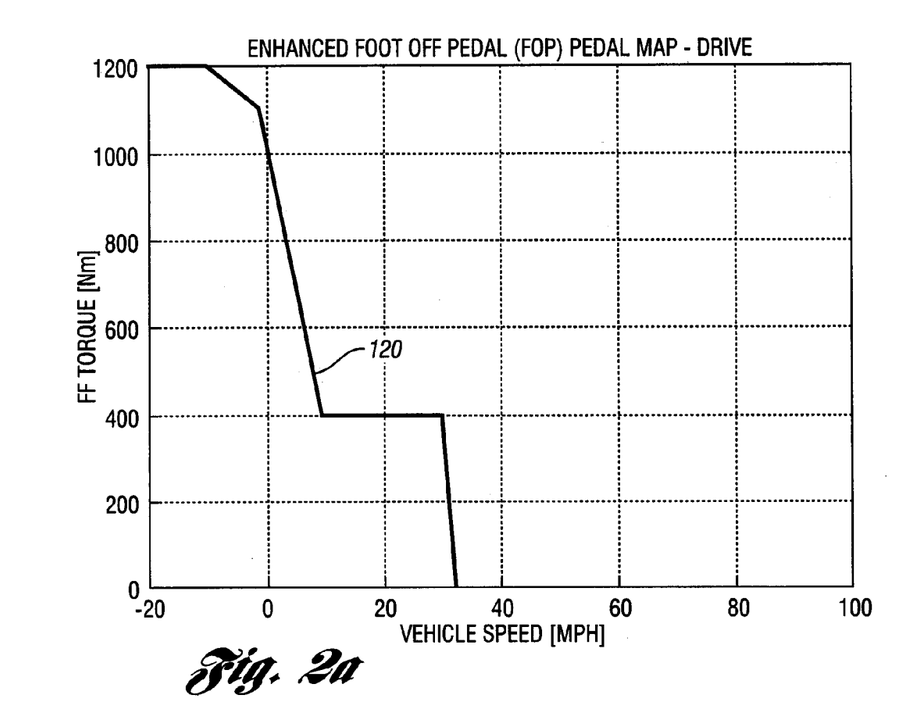
FIG. 2a is a plot of an enhanced foot off pedal (FOP) position feed-forward torque vs. vehicle speed used in executing the strategy of the invention for forward drive.

FIG. 2*a* indicates that the maximum vehicle speed in the super-creep mode can be calibrated in a typical powertrain application. The torque progressively increases as the vehicle speed decreases, as shown at 120 in FIG. 2*a*. The corresponding map for reverse drive, shown in FIG. 2*b*, indicates that the maximum speed can be calibrated as shown in the look-up calibration table. As reverse drive speed approaches zero, the feed-forward torque becomes greater, as shown at 122. The feed-forward torque developed at 116 or 118 is compared at summing point 120 to the estimated wheel torque to determine a torque error, as shown at 122.

The torque error, a controller software loop delta time and an integral gain value for output shaft speed, shown at 124, are combined at multiplier 126 to produce a torque feedback term, shown at 128. The calibrated integral gain value for output shaft speed is obtained by a calibrated integral gain look-up table 130, which has an output shaft speed input shown at 132.

The torque feedback term at 128 is combined with the final torque feedback shown at 134. This is indicated at summing point 138. The feedback torque at 134 is clipped at 136 between a lower limit term and a feedback torque plus a feedback term upper limit after the feedback torque and the torque feedback term are combined at summing point 138.

The feedback torque at 134 and a feed-forward torque shown at 140, which is developed by the feed-forward torque look-up tables 116 and 118, are added at summing point 142 to develop a final output shaft wheel torque.

The overall control strategy, which includes the strategy described with reference to the block diagram of FIG. 2, is shown in the flow diagram of FIG. 3. This overall strategy includes super-creep strategy entry conditions, which will be described with reference to FIGS. 4-6. After the entry conditions are satisfied, the strategy shown in the block diagram of FIG. 2 will be executed. This will be described with reference to FIGS. 7 and 8.

Figure 3:
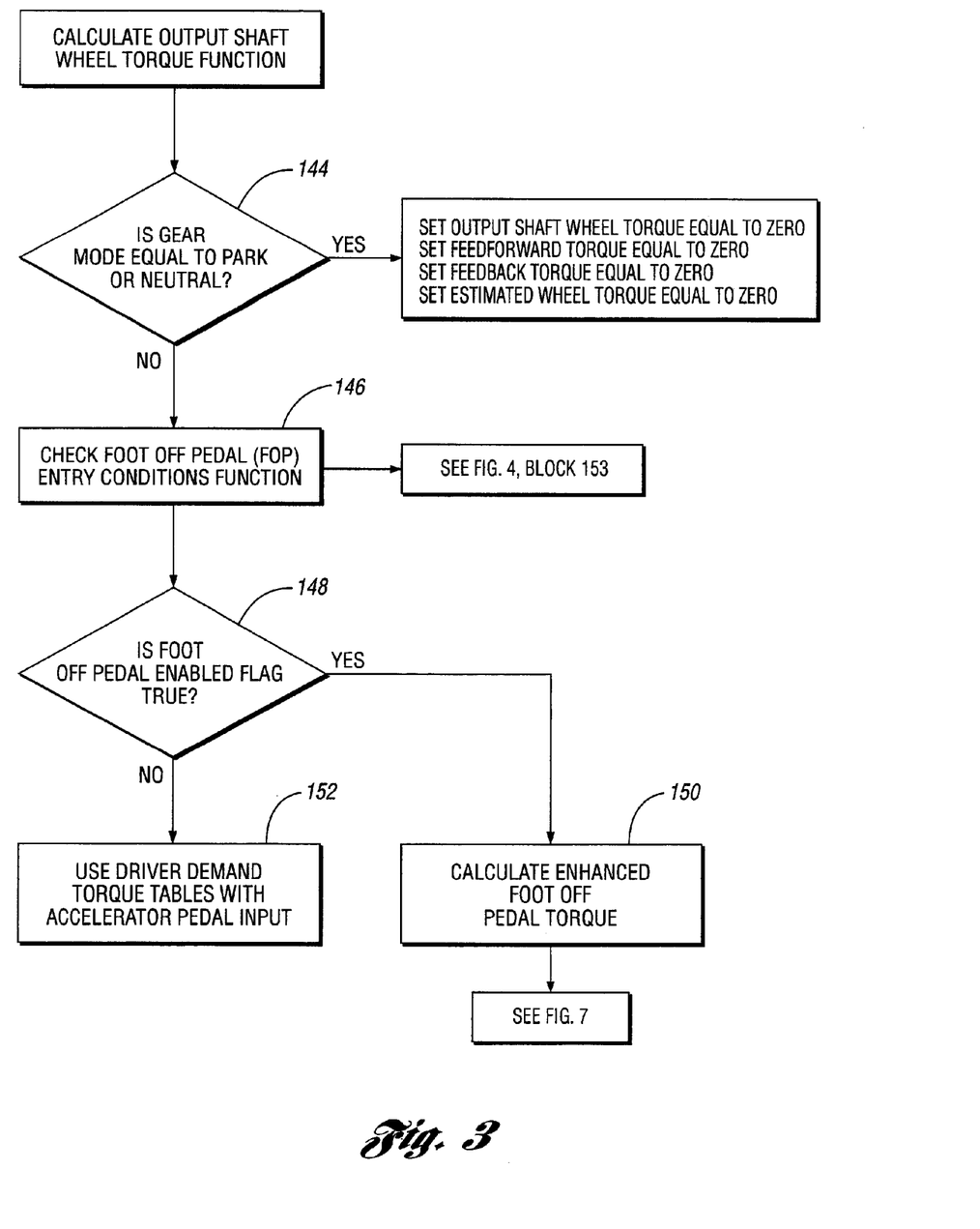
FIG. 3 is a flow diagram of the algorithm used in the overall control strategy for the super-creep control strategy seen in FIG. 2.

Referring first to FIG. 3, the overall control strategy routine for calculating output shaft wheel torque begins with an inquiry at step 144 as to whether the powertrain is conditioned by the operator for "park" or "neutral". If the powertrain is conditioned for "park" or "neutral", there is no need to execute the super-creep strategy of the invention. Thus, the output shaft wheel torque, the feed-forward torque, the feedback torque and the estimated wheel torque are set to zero. If the inquiry at 144 indicates that the powertrain is conditioned for reverse drive or forward drive, the super-creep strategy of the invention may be used.

Figure 7:
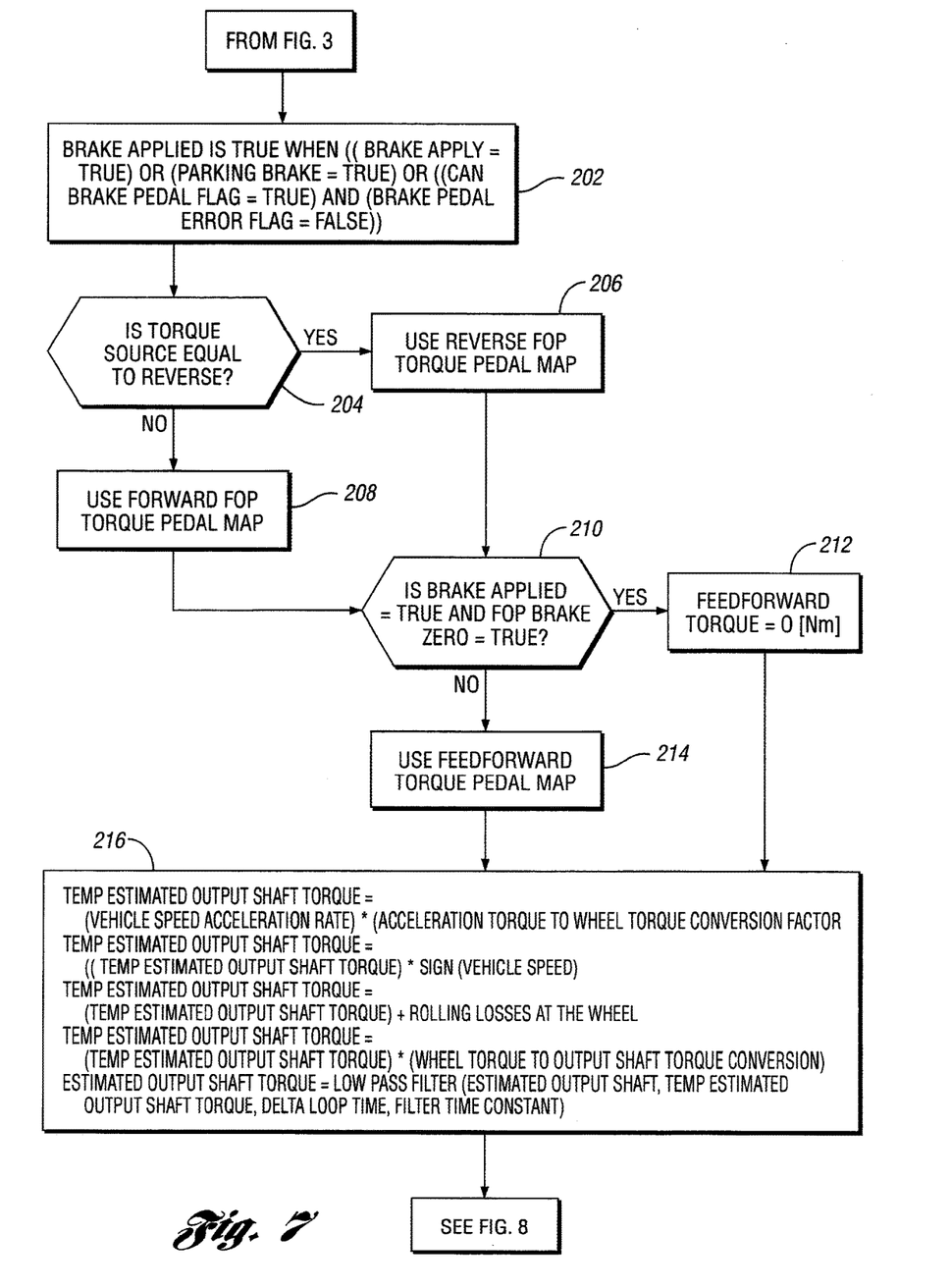
FIG. 7 is a further illustration of the control strategy generally shown in FIG. 3 for calculating super-creep torque.

At action block 146, a check will be made to determine whether the entry conditions for the super-creep strategy of the invention are satisfied. this step is carried out also at 153 in FIG. 4. Then, an inquiry is made at 148 regarding whether the flag indicating that the driver's foot is off the brake pedal is true. If it is true, then the super-creep strategy for enhanced performance may be carried out, as shown at 150. Otherwise, the driver demand torque tables with accelerator pedal input would be used by the driver in the usual fashion, as shown at 152. If the strategy routine proceeds to step 150 in FIG. 3, the strategy routine of FIG. 7 is carried out.

Figure 4:
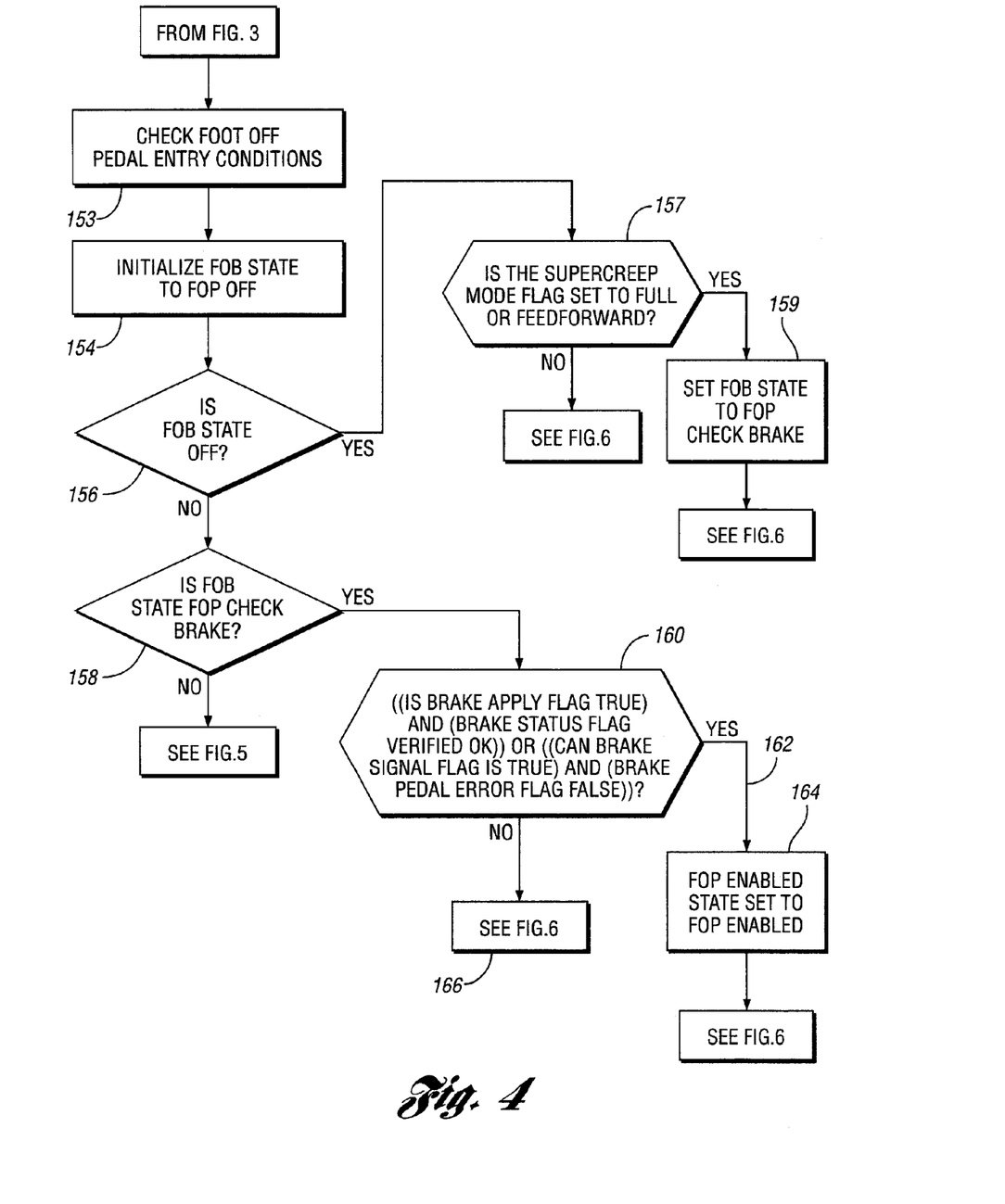
FIG. 4 is a partial function flow diagram illustrating a portion of the entry conditions for the overall super-creep control strategy of FIG. 3.

FIG. 4 shows at 153 the beginning steps of the routine for checking the entry conditions for the super-creep strategy of the invention. This is the step included also in FIG. 3 at 146. It initiates the strategy routine in FIG. 4. When the super-creep strategy is initialized, as shown at 154, it is determined at decision block 156 whether the super-creep strategy state is off. Hereafter, the super-creep strategy state may be referred to as a foot-off pedal state (FOP).

Figure 6:
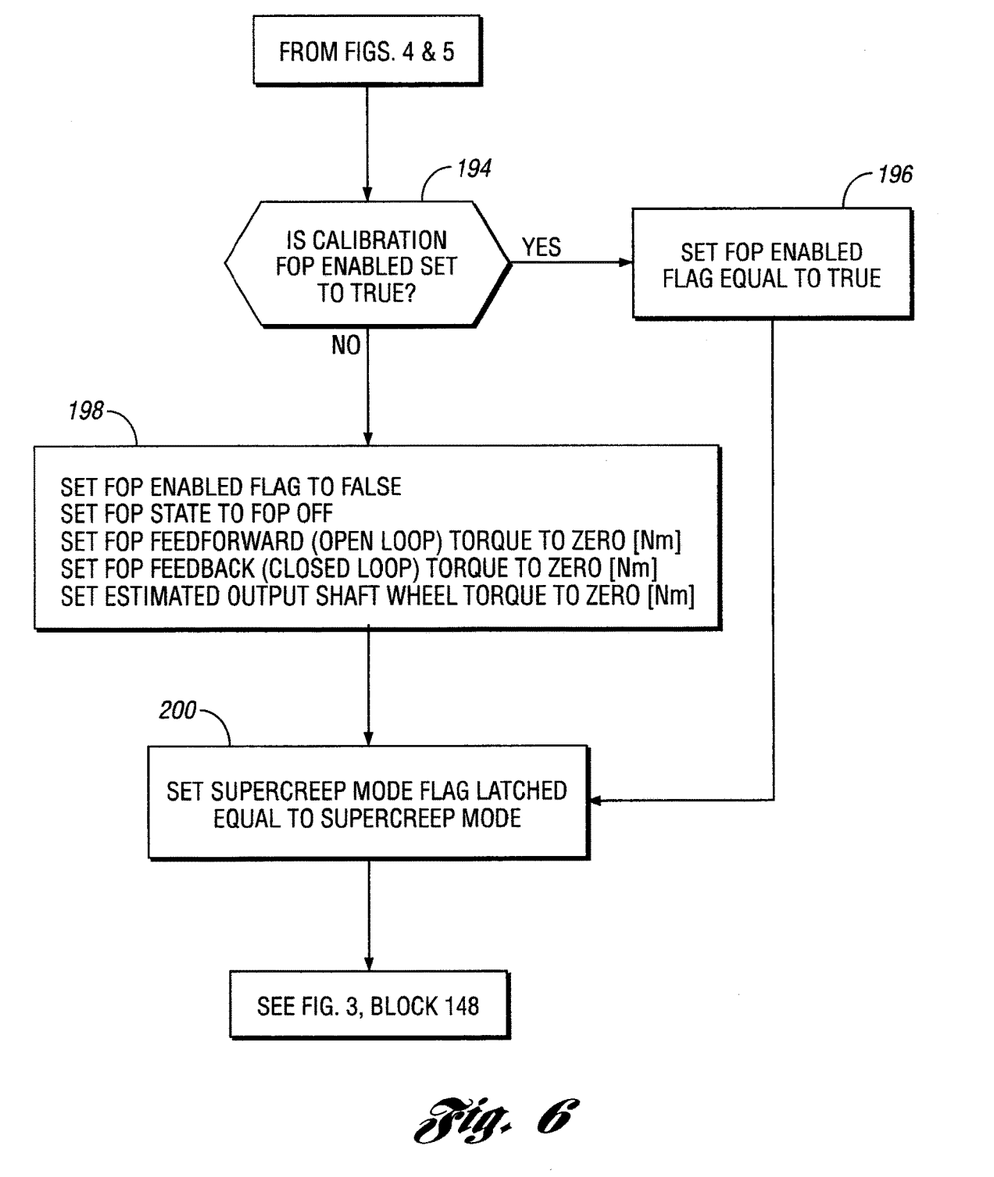
FIG. 6 is a further partial flow diagram of the entry condition partially shown in FIGS. 3 and 4.

Following the inquiry at 156, it is determined at decision block 158 whether the brake is applied. If it is applied, it is determined at decision block 160 whether the brake apply flag is true and whether the brake status flag is verified to be okay. If the brake error flag is false, but the control area network brake signal flag is true, the result of the inquiry at 160 is positive, as shown at 162. This would be followed by enabling the FOP strategy at action block 164. If the inquiry at 160 is negative, the routine will proceed to the entry condition strategy of FIG. 6, which will be described subsequently, as shown at 166. If the inquiry at 156 is true, and the inquiry at 157 is true, the FOB state is set to check brake at 159 before the routine continues as shown in FIG. 6. The FIG. 6 routine is carried out also if the inquiry at 157 is not true.

Figure 5:
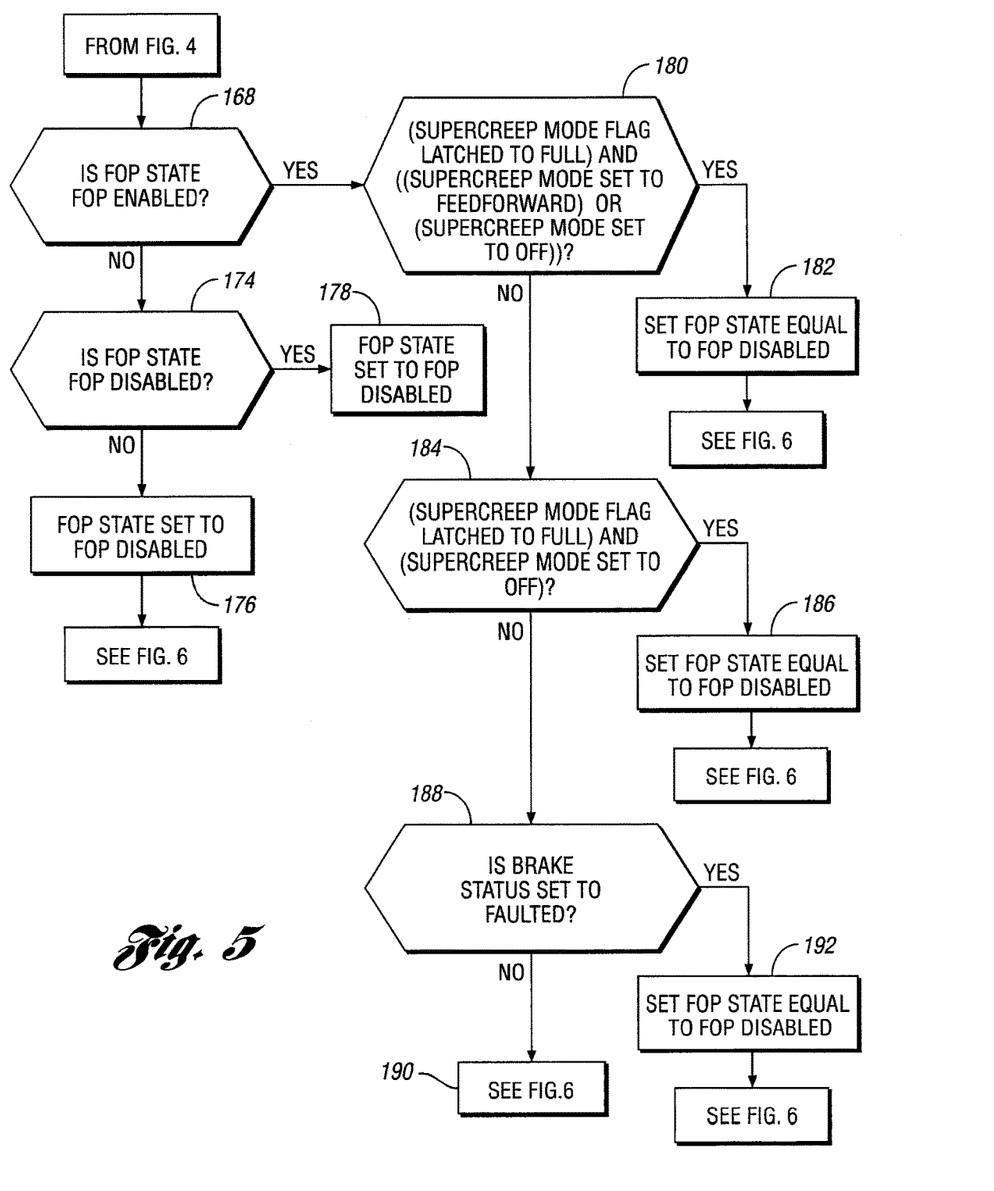
FIG. 5 shows a further portion of the entry condition partially shown in FIG. 4.

In FIG. 5, the inquiry at 164 is repeated, as shown at 168. If the FOP state is not enabled, that information is confirmed at decision block 174 in FIG. 5, and execution of the strategy of the invention will not occur, as shown at 176. If the inquiry at 174 is positive, the disabled FOP state is confirmed at 178. If the brake check at 158 in FIG. 4 indicates that the FOB state flag is off at 176, the routine moves to FIG. 6. Likewise, if the strategy routine proceeds to block 160 in FIG. 4 and the condition described in block 160 is either true or false, the strategy moves to FIG. 6 at 194.

If the FOP state is enabled, a super-creep mode flag is latched to "full" and the super-creep mode set to feed-forward; or if the super-creep mode is set to "off", as shown at 180, the FOP state becomes disabled, as shown at 182.

If the inquiry at 180 is negative, a confirmation is made at 184 regarding whether the super-creep mode flag is latched to full and the super-creep mode is set to off. A positive response will result in setting the FOP state equal to the FOP state disabled status, as shown at 186, the routine will move to FIG. 6. If the confirmation at 184 is negative, an inquiry is made at 188 regarding whether the brake status is faulted. If it is not faulted, the routine will proceed to the entry condition strategy of FIG. 6, as shown at 190. If it is faulted, the strategy will set the FOP state flag to FOP state disabled, as shown at 192, and it will move to the routine of FIG. 6.

If the FOP state strategy flag is enabled, as indicated by the decision block 196 in FIG. 6, the FOP state strategy is enabled. If the inquiry at 194 is negative, the FOP state strategy is not available. Thus, the FOP state enable flag is set to false, the FOP state is set to FOP off, the FOP state feed forward torque is set to zero, the FOP state feedback torque is set to zero and the estimated output shaft wheel torque is set to zero, as indicated by action block 198. Simultaneously, the super-creep mode flag is latched in the super-creep mode as shown at 200.

If the entry conditions described with reference to FIGS. 4-6 result in a setting of the super-creep mode flag being latched to the super-creep mode at 200 in FIG. 6, the routine will enter the super-creep mode strategy of FIG. 7, which as previously mentioned, is illustrated in block diagram form in FIG. 2.

The super-creep mode routine will occur when the brake applied flag is true, or the parking brake flag is true, or the control area network (CAN) brake pedal flag is true and the brake pedal error flag is false. This is illustrated at 202 in FIG. 7. It then is determined at 204 whether the operator has conditioned the powertrain for forward drive or for reverse drive.

If the driver has selected reverse, reference will be made by the controller to the reverse enhanced FOP pedal map of FIG. 2b. If the powertrain is conditioned for forward drive, reference will be made by the controller to the drive-enhanced FOP pedal map of FIG. 2a. The maps of FIGS. 2b and 2a are indicated, respectively, by numerals 206 and 208 in FIG. 7.

Figure 2B:
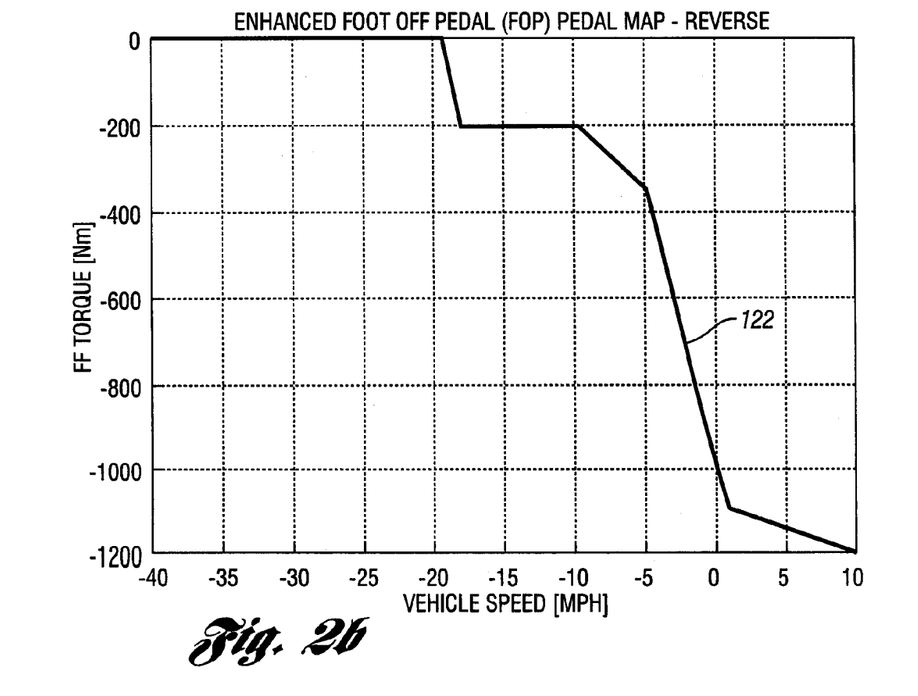
FIG. 2b is a plot of enhanced foot off pedal (FOP) feed-forward torque vs. vehicle speed used in executing the strategy of the invention for reverse drive.

The information obtained from FIG. 2a or 2b is used in the inquiry at decision block 210. If it is determined at decision block 210 that the brake is applied, there will be no feed-forward torque, as shown at 212. If the brake is off on the other hand, the routine will use the feed-forward torque pedal map shown at 206 or 208. This is indicated at 214 in FIG. 7.

A summary of the status of each entry condition is shown at block 216 of FIG. 7. This information is stored in ROM memory of controller 10 and used in executing the strategy of FIG. 8.

Figure 8:
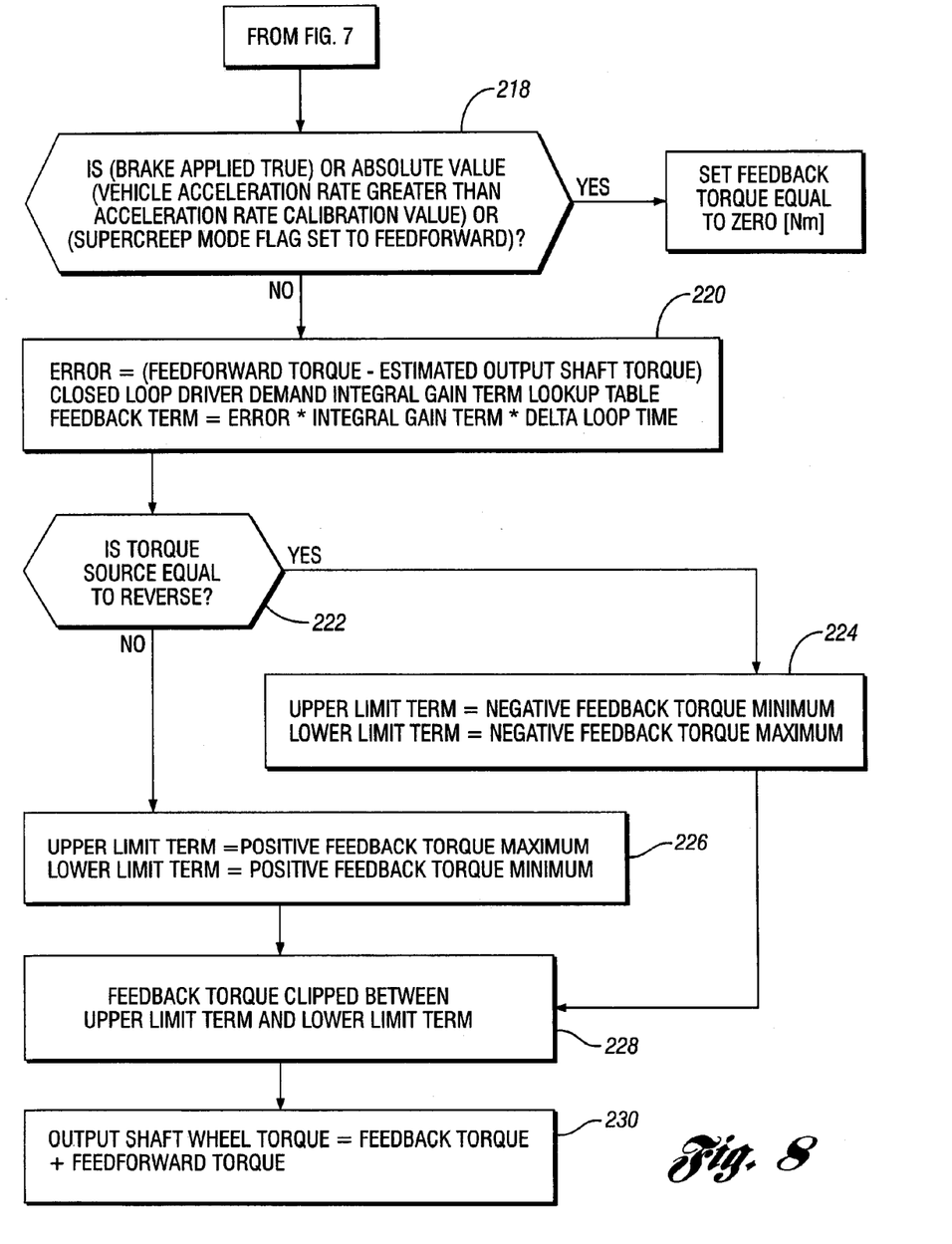
FIG. 8 is a continuation of the flow chart of FIG. 7.

The control routine will proceed as shown in FIG. 8, where it is confirmed at 218 that the brake is applied, that the vehicle acceleration rate is greater than a calibrated value or that the super-creep mode flag is set to feed-forward. If that is true, the feedback torque at 134 in FIG. 2 would be zero.

At action block 220, the error at 122 in FIG. 2 is calculated. It then is determined at 222 whether the driver has selected reverse drive or forward drive. This was explained previously with respect to the block diagram of FIG. 2 where switch 112 and feed-forward torque tables are shown for reverse drive and forward drive at 116 and 118, respectively. If reverse drive has been selected, maximum and minimum torque values are determined at action block 224 using the table 116 in FIG. 2. If forward drive has been selected, upper and lower torque limits are determined at action block 226 using the pedal map shown at 118 in FIG. 2.

After the upper and lower torque limits are determined for reverse or forward drive, and after the torque feed-back term shown at 128 in FIG. 2 is calculated based on the product of loop delta time, torque error and integral gain value. The resulting torque feedback term is combined with feedback torque as shown at 128 in FIG. 2. That value is clipped between upper and lower saturation values at action block 228.

The output shaft wheel torque is calculated by adding feedback torque to feed-forward torque at action block 230. This was described previously with respect to summing point 142 in FIG. 2.

Although an embodiment of the invention has been described, it will be apparent to persons skilled in the art that modifications may be made without departing from the scope of the invention. All such modifications and equivalents are intended to be governed by the following claims.

What is claimed:

1. A method for controlling torque delivery to vehicle traction wheels in a hybrid electric vehicle, comprising:
controlling vehicle wheel torque while operating in a limited operating mode in response to a vehicle sensor signal anomaly based on a vehicle speed, acceleration rate, an estimated vehicle wheel torque, and an acceleration rate to wheel torque conversion factor.

2. The method set forth in claim 1 wherein the estimated vehicle wheel torque is based on whether a driver has requested forward drive vehicle wheel torque or reverse drive vehicle wheel torque.

3. The method of claim 1 wherein the vehicle includes driver-controlled traction wheel brakes, and wherein activation of the traction wheel brakes zeroes the estimated wheel torque.

4. A method for controlling torque delivery to vehicle traction wheels for a hybrid electric vehicle powertrain having an internal combustion engine and at least one electric motor for developing traction wheel torque, and a controller for controlling torque delivery from the engine and the electric motor to the traction wheels, the method comprising:
in response to detecting an accelerator pedal position anomaly:
determining a temporary estimated wheel torque using a vehicle speed acceleration rate and an acceleration rate to wheel torque conversion factor;
developing a feed-forward torque based upon traction wheel speed without regard to the accelerator pedal position;
comparing estimated wheel torque and feed-forward torque to determine a torque error; and
combining the feed-forward torque and torque error to obtain a final wheel torque request.

5. The method of claim 4, wherein combining the feed-forward torque and torque error includes a computation of an integral gain value of traction wheel speed to obtain a torque feedback; and combining the torque feedback and feed-forward torque.

6. The method of claim 5 wherein combining the feed-forward torque and torque error includes limiting the torque feedback to torque values within upper and lower saturation values.

7. The method of claim 4 wherein developing a feed-forward torque includes using a first speed-torque table for forward drive traction wheel speed and including a computation of an integral gain value based on traction wheel speeds to obtain feed-forward torque for forward drive, and using a second speed-torque table for reverse drive traction wheel speed to obtain a feed-forward torque for reverse drive.

8. The method of claim 4 wherein the vehicle powertrain includes driver-controlled traction wheel brakes, and wherein activation of the traction wheel brakes reduces the final wheel torque request.

9. A method for controlling a vehicle powertrain having an engine, a controller, and an accelerator pedal for commanding a traction wheel torque, comprising:
controlling the traction wheel torque independently of a signal from the accelerator pedal based on a feed-forward torque associated with forward or reverse gear and current vehicle speed and a difference between the feed-forward torque and an estimated torque associated with a vehicle acceleration rate.

10. The method of claim 9, further comprising:
wherein the step of combining the feed-forward torque and torque error includes using a calibratable look-up table of integral gain values based on wheel speed to obtain a torque feedback; and
combining the torque feedback and feed-forward torque.

11. The method of claim 9 wherein controlling the traction wheel torque comprises using a first speed-torque table for forward drive traction wheel speed to obtain the feed-forward torque for forward drive and a second speed-torque table for reverse drive.

12. A method for controlling a hybrid vehicle having an accelerator pedal, a brake pedal, an engine, and a traction motor, comprising:

controlling wheel torque independently of accelerator pedal position when the brake pedal is not depressed based on a feed forward torque and a target vehicle acceleration associated with current vehicle speed in response to an accelerator pedal position signal anomaly.

13. The method of claim 12 wherein controlling wheel torque comprises controlling wheel torque based on a feed forward torque from one of a first speed-torque table associated with forward drive and a second speed-torque table associated with reverse drive.

14. The method of claim 12 further comprising:

limiting wheel torque to a threshold associated with operation in a limited operating mode in response to the accelerator pedal position signal anomaly.

15. The method of claim 12 further comprising controlling wheel torque based on a difference between an estimated torque associated with the target vehicle acceleration and the feed forward torque.

16. The method of claim 12 further comprising controlling wheel torque based on an integral gain factor associated with the current vehicle speed and applied to the feed forward torque.

* * * * *